3,264,070
REMOVAL OF ACTINIDE HALIDES
FROM ALUMINA
Devabhaktuni Ramaswami, Westmont, Norman M. Levitz, Bellwood, and Albert A. Jonke, Elmhurst, Ill., assignors to the United States of America as represented by the United States Atomic Energy Commission
No Drawing. Filed June 30, 1964, Ser. No. 379,410
2 Claims. (Cl. 23—326)

The invention described herein was made in the course of, or under, a contract with the United States Atomic Energy Commission.

This invention relates to the removal of uranium halide and plutonium halide from sintered alumina and the simultaneous regeneration of the latter.

Nuclear uranium and plutonium fuel, such as uranium-aluminum alloy, uranium-zirconium alloy and ceramic uranium dioxide-plutonium dioxide fuel, either in the form of granules or of shaped bodies, is often processed by treatment with hydrogen halide and/or halogen gas in gaseous form. One method of carrying out these reactions is by using a so-called fluidized bed. (A fluidized bed is obtained by passing a gas upwardly through a bed of solid particles at a sufficient velocity to separate the particles from each other. In this condition a certain degree of freedom to move is imparted to the solid particles so that the solid-gas mixture behaves much like a liquid and has the ability to flow under the influence of a hydrostatic head.) The preferred "bed material" is sintered granular alumina, but other refractory materials, such as calcium fluoride and magnesium fluoride, have also been used. The process of this invention is applicable to any of these bed materials.

In the course of the above-described reaction, some of the actinide halide formed is held rather strongly by the bed material. This is disadvantageous, because the retained actinides represent a loss, since they are not available for further processing together with the fuel recovered in the process.

It has been tried to remove these adsorbed or otherwise held actinide halides from the alumina or other refractory by fluorination under varying conditions, but the results were not too satisfactory, since a portion of the actinides still remained on the alumina. The bed material containing actinide halide was contacted, for instance, with concentrated fluorine gas containing between 90 and 100% by volume of fluorine at approximately 250° C., but the actinide removal was highly unsatisfactory. Fluorination with the concentrated fluorine gas at a temperature of 500° C. again did not bring about removal of the actinide to a sufficiently high degree. Fluorine gas containing about 10% by volume of fluorine and 90% nitrogen was tried at both 250 and 500° C. also without success.

It was then surprisingly found that, when the fluorination reaction was carried out in two steps, the first step using dilute fluorine gas and low temperatures and the second step concentrated fluorine gas and high temperatures, a radically more efficient removal of actinides from the alumina or other bed material was obtained than under the above-described one-step conditions. This will be illustrated later in Example I.

For the first step the fluorine concentration of between 5 and 10% by volume and a temperature of between 225 and 275° C. was preferred, while for the subsequent step a fluorine concentration of between 90 and 100 v/o and a temperature of between 475 and 575° C. had to be used to accomplish the improved results. A temperature increase to 400° C. only again proved unsatisfactory. The diluent gas for the fluorine gas used in the studies that led to this invention was always nitrogen.

There are various ways of bringing about the two fluorination steps. One, for instance, comprises initial heating at between 225 and 275° C. and reacting at the same time with the dilute fluorine-nitrogen mixture containing between 5 and 10 v/o of fluorine gas, then increasing the temperature to between 475 and 575° C. and when reached reacting the bed material with the concentrated fluorine gas containing between 90 and 100% by volume of fluorine. However, either the temperature or the fluorine concentration or both can be increased gradually to the desired higher levels. In the preferred method the fluorine concentration is increased gradually, because a sudden operation with a 90% fluorine gas causes too violent a reaction because of its exothermic character. The important factor, it is again emphasized, is that a low temperature-low fluorine-concentration step and a high temperature-high fluorine concentration step are performed. The actinide halides are converted thereby to the hexafluoride, which are volatilized away from the alumina.

The first step can be maintained for from 15 minutes to 2 hours and the second step for from 2 hours to 6 hours. It is preferred, however, to operate at first-step conditions for about 2 hours so that the bulk of the actinides is removed in the first step and less heat is developed in the second step.

If the material to be treated by the process of this invention contains also fission product halides, a separation of the actinide from the fission products that form fluorides not volatile at about 500° C. is obtained at the same time.

In the following, an example is given to illustrate the process of this invention and the advantages which it has over previously investigated one-step procedures.

*Example I*

As the starting material alumina "bed material" was employed that had been used for the reaction of uranium-aluminum alloy fuel first with HCl gas and then with HF gas; it contained about 1% by weight of uranium tetrafluoride. This alumina was heated to 250° C. and contacted with a fluorine-nitrogen mixture containing 90% by volume of fluorine. After 2 hours the alumina was analyzed by a fluorophotometric method and found to contain 0.04 w/o of uranium. Thereafter the material was again treated under the same conditions for another 6 hours, but a further reduction of the uranium content was not accomplished. Alumina to be discarded should contain not more than 0.01 w/o of uranium, which usually indicates a uranium recovery of about 99%.

A second sample of the same uranium-fluoride-containing alumina was heated to 500° C. and at this temperature contacted with 90% fluorine gas. After 5 hours of fluorination, analysis showed that the amount of uranium had been reduced to 0.03% by weight. A further treatment for 6 hours did not bring about any further reduction of the amount of uranium.

A third alumina sample with 1% uranium tetrafluoride was then treated for 6 hours at 475° C. with a 10% fluorine-nitrogen mixture. The amount of uranium held by the alumina after this treatment was 0.06%.

A fourth sample of alumina containing 0.3 w/o of uranium tetrafluoride was subjected to a two-step treatment. First the sample was fluorinated for 1 hour at about 250° C. with a 10% fluorine mixture; the uranium was reduced to 0.035%. Treatment for another hour under the same conditions gave a uranium retention of 0.03%, and fluorination, again at 250° C. but with 90% fluorine gas, for still another hour did not change the uranium content at all. Thereafter the sample was fluorinated at 500° C. with a fluorine-nitrogen mixture of 90% by volume of fluorine for 2 hours; after this, the alumina had a uranium content of 0.0096% by weight.

This clearly shows the superiority of the two-step process of this invention over any of the one-step fluorination procedures.

*Example II*

Alumina containing 1.34% by weight of uranium as the tetrafluoride was used. It was treated by the two-step process of this invention in which the temperature was raised rather quickly from the lower to the higher level, but the fluorine content was increased gradually. For the first step, fluorination was performed for 1½ hours at 250° C.; the fluorine concentration in the beginning was 5 v/o, but it was gradually increased within the 1½-hour period to 90%. After this treatment, the uranium content on the alumina had been reduced to 0.098% by weight. Further fluorination at 250° C. with a 90% fluorine mixture resulted in a concentration of uranium on the alumina of 0.099% by weight, which, taking the possibility of analytical error into account, is the same as before. The alumina was then fluorinated at 500° C. for 2 hours, again beginning with a 5% fluorine-nitrogen mixture but gradually increasing the fluorine content to 90%. After the two hours, the alumina was again analyzed and found to contain 0.01% by weight of uranium.

The next example shows that both temperature and fluorine concentration can be increased gradually and that the two-step combination of low temperature-diluted fluorine with high temperature and the high fluorine concentration is necessary to obtain the optimum removal of uranium.

*Example III*

Two small multiplate fuel elements having zirconium-clad uranium-zirconium alloy plates had been reacted with hydrogen chloride and subsequently with hydrogen fluoride in a fluidized bed of alumina. This resulted in alumina containing about 0.58 w/o of uranium. A quantity of 296 grams of alumina was used for this example. Fluorination was then conducted according to this invention.

The table below shows the times, temperatures and fluorine concentrations used. The residual uranium contents of the alumina determined after each hour of treatment are presented, illustrating the benefits of this invention.

| Time, hr. | Temp., °C. | $F_2$ Concn., v/o | Residual Uranium, w/o |
|---|---|---|---|
| 0 | 250 | 10 | 0.58 |
| 1 | 325 | 10 | 0.17 |
| 2 | 400 | 10 | 0.13 |
| 3 | 500 | 10 | 0.09 |
| 4 | 500 | 10 | 0.05 |
| 5 | 500 | 50 | 0.03 |
| 6 | 500 | 90 | 0.01 |

It will be understood that the invention is not to be limited to the details given herein but that it may be modified within the scope of the appended claims.

The embodiments of the invention in which an exclusive property or privilege is claimed are defined as follows:

1. A process of removing adsorbed actinide halide from refractory material, comprising reacting said material with a gas containing 5 to 10 volume percent fluorine and 95 to 90 volume percent nitrogen at between 225 and 275° C. and thereafter reacting said material with a gas containing 90 to 100 volume percent fluorine and 10 to 0 volume percent nitrogen at between 475 and 575° C., whereby the bulk of the actinide halide is volatilized as hexafluoride.

2. The process of claim 1 wherein the fluorine concentration is increased gradually from between 5 and 10 volume percent to between 90 and 10 volume percent within the two heating steps.

References Cited by the Examiner

UNITED STATES PATENTS 2,750,273 6/1956 Smith _____ 23—14.5 X
2,756,125 7/1956 Abelson _____ 23—14.5 X
2,761,756 9/1956 Priest _____ 23—14.5 X BENJAMIN R. PADGETT, *Acting Primary Examiner.*

M. J. SCOLNICK, *Assistant Examiner.*